United States Patent

[11] 3,593,933

| [72] | Inventor | Ingo Grashorn<br>Wuppertal-Langerfeld, Germany |
|---|---|---|
| [21] | Appl No | 750,655 |
| [22] | Filed | Aug. 6, 1968 |
| [45] | Patented | July 20, 1971 |
| [73] | Assignee | J. P. Bemberg Aktiengesellschaft<br>Wuppertal, Germany |
| [32] | Priority | Aug. 14, 1967 |
| [33] | | Germany |
| [31] | | P 15 74 310.9 |

[54] DEVICE FOR THE SLIP-FREE COUPLING OF A DRIVE SHAFT TO A WINDING SLEEVE
10 Claims, 3 Drawing Figs.

[52] U.S. Cl. .................. 242/46.4,
242/68.2, 242/72, 279/2
[51] Int. Cl. ........................................ B65h 17/02,
B65h 75/30
[50] Field of Search .......................................... 242/46.4,
46.5, 72, 68.2; 64/30 RA, 27 R; 279/2, 1 R

[56] References Cited
UNITED STATES PATENTS

| 1,649,426 | 11/1927 | Van Raust | 64/27 R |
|---|---|---|---|
| 1,733,771 | 10/1929 | Baker | 64/27 R |
| 3,096,106 | 7/1963 | Wanner | 64/27 R |
| 3,263,452 | 8/1966 | Janssen et al | 64/30 |
| 2,390,168 | 12/1945 | Piot | 242/46.4 UX |
| 2,830,792 | 4/1958 | Sears | 279/1 R UX |
| 2,888,282 | 5/1959 | Naimer | 279/1 R UX |
| 3,006,565 | 10/1961 | Pelletier | 242/46.4 |
| 3,007,652 | 11/1961 | Heckman | 242/72 |
| 3,024,630 | 3/1962 | Billups | 64/30 RA |
| 3,355,121 | 11/1967 | Wright | 242/68.2 |

Primary Examiner—George F. Mautz
Assistant Examiner—Gregory A. Walters
Attorney—Johnston, Root, O'Keeffe, Keil, Thompson & Shurtleff ABSTRACT: A device for the slip-free coupling of a drive shaft to the winding sleeve of a takeup spool, e.g. in the winging collection of filaments, threads, yarns, foils and the like onto a cylindrical spool or roller, the coupling means consisting essentially of a hollow tubular resilient elastic casing drawn loosely onto a cam- or gear-shaped collar having radially projecting arcuate cogs adapted to engage a polygonal inner periphery of the hollow tubular casing.

PATENTED JUL 20 1971

3,593,933

INVENTOR:
INGO GRASHORN
BY Marzall, Johnston, Cook & Root
ATT'YS

DEVICE FOR THE SLIP-FREE COUPLING OF A DRIVE SHAFT TO A WINDING SLEEVE

For the winding of filaments, threads or foils onto a takeup spool, roller, drum or the like, it has been a general practice to rotate the takeup spool by means of a drive shaft connected to the winding sleeve of the takeup spool through an intermediate coupling device, e.g. in the form of metal clamping sleeves or chucks containing recessed grooves or through sleeve clamps or chucks having radially adjustable segments or through clamping means having axially adjustable rubber sleeves as expansion elements. All of these known devices require an adjustment of a constant, radially directed force of expansion prior to the commencement of the winding process, particularly where the coupling is accomplished by frictional engagement of the radially displaceable clamping elements against the inner surfaces of the winding sleeve with a predetermined and constant clamping pressure. The force of expansion or clamping pressure must only be so great that the empty or nonloaded winding sleeve is not overstrained or overloaded in itself. However, since the force of expansion or clamping pressure cannot be adjusted during the winding process, it is not always adequate to guarantee a slip-free operation of the coupling due to the increasing countertorque which builds up as the winding process progresses.

One known clamping device permits the necessary bearing or clamping pressure to be produced by rings expanding under centrifugal force. This device permits an adjustment of a relatively constant bearing force during the winding process, but this adjustment is dependent only on the rotational velocity of the drive shaft, so that slip can still take place as the countertorque increases. Also, where the speed of the shaft remains relatively constant during winding, the amount of adjustment in the bearing pressure is very slight.

Any slip in the coupling means for the drive shaft and winding sleeve is extremely disadvantageous in that it results in the production of a more loosely wound thread or foil package and can cause irregularities in the winding of the package. Furthermore, such slip shortens the working life of the clamping or coupling device, the design of which is usually extremely complicated.

One object of the present invention is to provide an improved slip-free coupling mechanism to connect the drive shaft to the inner periphery or surfaces of a winding sleeve, wherein the coupling mechanism comprises a resiliently expandable casing drawn over a rigid collar mounted on the drive shaft. A specific object of the invention is to provide a slip-free coupling means between a drive shaft and a winding sleeve of a takeup spool, wherein the circumferential bearing or clamping pressure of the coupling means will increase in proportion to the increasing countertorque transmitted by the winding sleeve.

Still another object of the invention is to provide a slip-free coupling device which is easily constructed and has only a few working parts but which provides a slip-free positive frictional engagement of a drive shaft with the winding sleeve of a takeup spool. These and other objects and advantages of the invention will become more apparent upon a consideration of the following detailed description of the invention.

It has now been found, according to the present invention, that a substantial improvement can be achieved in the slip-free coupling of a drive shaft to a winding sleeve for the takeup winding of filaments, threads, foils or the like by means of a radially expandable gear-locking or cam-locking mechanism comprising: a rigid collar connected to the drive shaft and having a plurality of radially projecting arcuate cogs forming its outer peripheral surface, and a resilient hollow tubular casing composed of an elastomeric material drawn loosely with a slight tolerance over the collar, this casing in cross section having a circular outer periphery adapted to frictionally engage the inner circumferential surface of the winding sleeve and a polygonal inner periphery with its sides disposed along the arcuately sloping sides of the cogs so as to be urged resiliently outwardly by these cogs in response to increasing countertorque transmitted by the winding sleeve.

The invention is further illustrated and described in detail in connection with the accompanying drawing, wherein.

Figure 2:
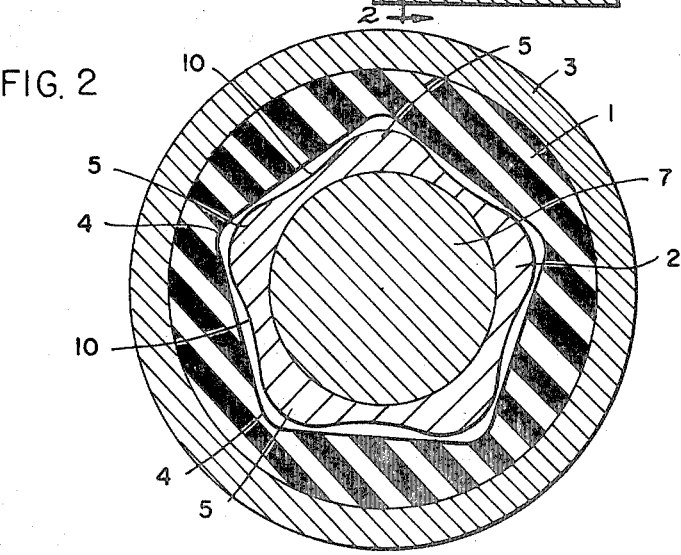
FIG. 2 is a cross-sectional view taken along line 2–2 of FIG. 1.

As set forth in each of the Figures, a hollow resilient shell or casing 1, composed of an elastomeric material such as a polyurethane or rubber material, is drawn over a collar 2 composed of metal or another solid and rigid material. Before the device is placed into operation, a winding sleeve 3 (illustrated only partially) is simply pushed part way or completely over the casing 1. The casing 1, when viewed in cross section as shown in FIG. 2, is shaped as a regular polygon having $n$ angles or corners 4 and $n$ sides extending between the angles or corners, $n$ being equal to 5 in the illustrated embodiments. The sides of the polygonal-shaped inner periphery of the casing 1 preferably extend in a straight line or present a flat plane when viewed radially. Also, the corners of angles 4 of the polygonal-shaped hollow interior of the casing are preferably rounded for ease in manufacture. Each of the arcuate cogs 5 on the outer peripheral surface of the collar 2 fit with a slight tolerance into the angles or corners 4 of the hollow casing 1, these cogs having flanks or arcuate side surfaces sloping radially inwardly to point 10 intermediate two adjacent cogs. the collar itself is firmly fastened to the drive shaft 7 by any suitable means such as the clamping screw 6. The collar may also be keyed to the drive shaft in order to make certain that it is firmly locked in place for direct rotation with the drive shaft.

The inner cross section of the shell or casing 1 is preferably in the form of a regular polygon with approximately three to ten, preferably five to eight, angles and sides so that the wall thickness of the casing 1 uniformly decreases and again increases in the peripheral or circumferential direction. In the examples shown in the drawing, the casing thus has five relatively weak points of flexure corresponding to the angles 4 with a uniformly increasing wall thickness between these points of flexure. The cross section of the metal collar 2 is then likewise formed as a regular pentagonallike structure but with its radially projecting corners being rounded smoothly to provide radially projecting arcuate or camlike protuberances 5 adapted to slidingly engage the sides of the polygonal inner periphery of the casing 1, these sides being disposed along the arcuately and radially inwardly sloping sides of the cogs or protuberances 5.

Although the protuberances or cogs 5 fit loosely with a slight clearance or tolerance into the angles or corners 4 of the casing 1, the resilient structure of the casing prevents any damage to the coupling device when suddenly starting the winding process with rapid rotation of the drive shaft forcing the cogs of the collar into contact with the interior polygonal sides of the casing 1.

Figure 1:
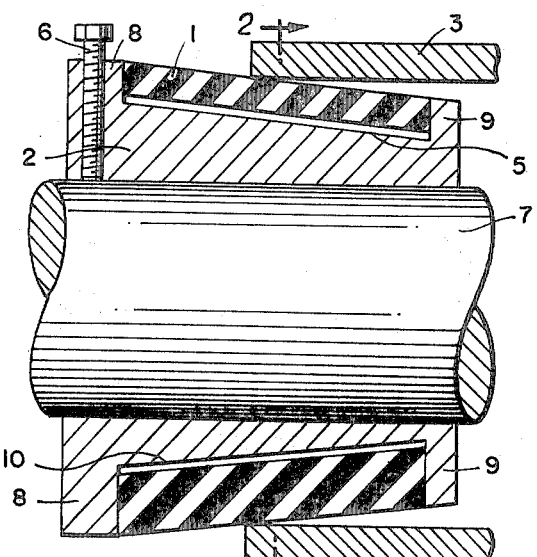
FIG. 1 is a longitudinal sectional view taken along the axis of rotation of the drive shaft and coupling device.
Figure 3:
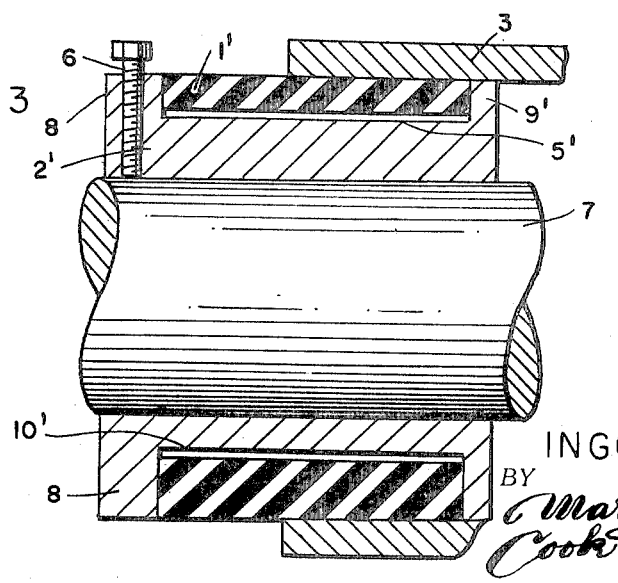
FIG. 3 is a longitudinal cross-sectional view along the axis of a drive shaft with a slightly different embodiment of the coupling device shown in FIG. 1.

In the embodiment shown in FIG. 3, the casing 1' has a cylindrical outer circumference as compared to the tapered circumference of the casing shown in FIG. 1, with the casing 1' being carried loosely around the cammed surfaces 5' and 10' of the collar 2'. Thus, the device of FIG. 3 has a constant cross section over the length of the casing 1' and the corresponding cammed portion of the collar 2', e.g. so that the cross section shown in FIG. 2 extends uniformly over this length. The flange 9' also has the same outer diameter as the flange 8. In this instance, the winding sleeve 3 is seated concentrically around the collar 2' and drive shaft 7 in frictional engagement with the concentric resilient casing 1'. When the drive shaft is at rest, the resilient casing should engage the inner surface or periphery of the winding sleeve 3 with a frictional bearing pressure which is just sufficient to transmit the rotation of the drive shaft to the empty or nonloaded sleeve as the winding process is begun. Thereafter, with an increasing load on the winding sleeve, it will be found that the arcuately profiled collar exerts a stronger and stronger bearing pressure radially outwardly through the deformable resilient casing so that no slip can occur even with very heavy winding loads. On the other hand, once the winding process is completed, the resilient casing is easily returned to its relatively loosely fitting position over the arcuately profiled collar on the drive shaft, and the winding sleeve can then be readily removed from its normal engaging position on the coupling device.

The coupling device of the invention may also be used in pairs, for example, when frictionally engaging and driving an extremely long winding sleeve 3 as may be required for the takeup winding of foils or wide bands. In this case, it is desirable to design the collar and casing of the coupling means as shown in FIG. 1 with a slight degree of inclination so that the outer diameter tapers slightly in a direction toward the winding sleeve 3. The conical tapering of the casing 1 and the collar 2 in FIG. 1 has been greatly exaggerated, simply for purposes of illustration. In this manner, long winding sleeves may be fitted firmly at either end onto the hollow casing 1 of two separate coupling devices, even though the inner diameter of such winding sleeves may derive from an average or means value. By loosening and retightening the clamping screw 6, the individual collar and casing coupling means can be moved to any position longitudinally along the drive shaft so as to exert a predetermined amount of pressure on the inner circumference of the winding sleeve before the winding apparatus is placed in operation. When the coupling device of the invention is employed as an individual frictional drive mechanism inserted into one end of a relatively short winding sleeve, for example when winding filaments, yarns the like, both the casing 1 and the collar 2 may be substantially cylindrical in shape without its ability to function being impaired in any way. In both cases, however, it is desirable to provide flanges 8 and 9 at either end of the substantially cylindrical collar as means of retaining the casing 1 in a longitudinally stationary position. Such flanges may be integral with the collar as illustrated or may be separate members threaded or otherwise fastened onto the collar. When the sleeve 3 has a very large diameter, that portion of the collar 2 projecting outside of the winding sleeve 3 is preferably provided with a flange, for example flange 8, which is expediently only a few millimeters larger than the inner diameter of the winding sleeve 3, so as to prevent the sleeve from slipping down past the coupling means.

Although the drawing illustrates a casing having an inner cross section in the shape of a pentagon, it will be apparent that the number of angles and sides n of the polygonal structure may be either smaller or larger than 5. However, especially good results have been achieved with regular polygons of approximately 5 or 6 sides with a corresponding number of arcuate cogs spaced uniformly around the collar. The coupling device of the invention can be readily adapted to wide limits of loading on the winding sleeve and rotational velocity of the drive shaft by varying the number of arcuate cogs and the wall thickness of the casing.

As the drive shaft 7 is rotated by any suitable driving means such as a conventional motor (not shown), the material being wound on the takeup spool, as represented by the winding sleeve 3, produces a countertorque relative to the torque of the positively driven shaft 7. Thus, as the diameter of the wound package increases, the countertorque also increases proportionately so that the resilient hollow casing 1 turns or slides further over onto the flanks or arcuately sloping sides of the cogs or cam-shaped protuberances 5 and is thereby pressed or deformed resiliently and radially outwardly. In this manner, the friction between the casing 1 and the winding sleeve 3 is increased in direct proportion to the amount of the load on the winding sleeve 3, i.e. with an increase in countertorque which is transmitted through the winding sleeve.

The functional operation of the slip-free coupling device of the invention is thus essentially characterized by the fact that the gear-shaped or arcuately profiled collar 2 turns with greater force relatively to the casing 1 as the diameter of the wound package being loaded on the winding sleeve increases together with an increase in the countertorque, so that the radially outward tensioning of the collar 2 causes the casing 1 to deform or expand radially outwardly with an increasing bearing or frictional pressure against the winding sleeve 3. In essence, then, the slip-free coupling device of the present invention acts as a radially expandable frictional coupling means exerting a variable bearing pressure on the inner surface of the winding sleeve coupled to the drive shaft, this variable bearing pressure being directly proportional to the amount of load or countertorque being transmitted by the winding sleeve.

The invention thus provides a frictional coupling device between the drive shaft and the winding sleeve of a takeup spool in which the amount of friction or bearing pressure between the sleeve 3 and the casing 1, due to the engagement of the gear locking mechanism or collar 2, is automatically increased during the winding process, and the coupling between the shaft 7 and the sleeve 3 always takes place in a slip-free manner. By comparison to known devices, the slip-free coupling mechanism of the present invention represents a substantial technical advance based upon a number of distinct and significant advantages or improvements. Thus, the coupling device according to the invention differs from known devices in its very simple design having only a few easily manufactured and easily replaced parts. At the same time, the device according to the invention requires only a limited movement of its individual elements which therefore are not liable to break down and permit the coupling device to be operated over long periods of time without replacement of individual elements. The coupling device of the invention also has the advantage that is eliminates any necessity of adjusting a radially expandable clamping means, and there is no need to find a particular optimum constant force of expansion which will provide satisfactory results under all winding conditions. Instead, with the slip-free coupling device of the invention, the force of radial expansion and the corresponding frictional or bearing pressure exerted on the winding sleeve is automatically adapted to the winding conditions, and the coupling device is particularly distinguished by its operational reliability at low speeds.

Minor variations can be easily made in the structure and arrangement of the individual elements of the coupling device disclosed herein without departing from the spirit or scope of the present invention.

I hereby claim the invention as follows:

1. A device for the slip-free coupling of a drive shaft to the winding sleeve of a takeup spool which comprises: a rigid collar connected to said drive shaft for rotation therewith and having a plurality of radially projecting arcuate cogs forming its outer peripheral surfaces; and a resilient hollow tubular casing composed of an elastomeric material drawn loosely over said collar, said casing in cross section having a circular outer periphery adapted to frictionally engage the inner circumferential surface of said winding sleeve and a polygonal inner periphery with its sides disposed along the arcuately sloping sides of said cogs so as to be urged resiliently outwardly by said cogs in response to increasing countertorque transmitted by said winding sleeve.

2. A device as claimed in claim 1 wherein said casing in cross section has the shape of a regular polygon and said arcuate cogs are spaced equidistantly around the circumference of said collar with each cog projecting radially into one angle of said polygon.

3. A device as claimed in claim 2 wherein said casing in cross section has the shape of a pentagon.

4. A device as claimed in claim 1 wherein said collar and casing when taken together in the rest position provide a substantially cylindrical outer surface with the casing fitting with a small tolerance over the collar.

5. A device as claimed in claim 1 wherein said collar and casing when taken together in the rest position provide a slightly tapering outer surface in the axial direction toward the winding sleeve to be engaged thereon, 6. A device as claimed in claim 1 wherein said collar contains outwardly projecting flange means at either end of the resilient casing to hold said casing in a stationary axial position.

7. In an apparatus for the takeup winding of threads or foils into a multiwound package on a spool having a hollow cylindrical winding sleeve, the improvement which comprises:

a drive shaft; means to rotate said shaft; and radially resilient gear locking means connected to said shaft and adapted to frictionally engage the inner cylindrical surface of said winding sleeve under a bearing pressure proportional to the amount of countertorque created by the load of the multiwound package on said spool, said gear locking means consisting essentially of a rigid collar fastened firmly to the drive shaft while having on its periphery $n$ cam-shaped protuberances, and a hollow tubular casing composed of a resilient elastomeric material which fits with a slight clearance over said collar and which has a circular outer profile while its inner profile is in the form of an $n$-angled polygon, $n$ corresponding to the number of said cam-shaped protuberances which have the same center angle as the angles of said $n$-angled polygon.

8. An apparatus as claimed in claim 7 wherein said cam-shaped protuberances are uniformly spaced around the periphery of the collar and the $n$-angled polygon is a regular polygon.

9. An apparatus as claimed in claim 8 wherein said polygon is a pentagon where $n=5$.

10. An apparatus as claimed in claim 7 wherein said collar and said casing when taken together in the rest position provide a slightly tapering outer circumferential surface in the axial direction toward the winding sleeve to be engaged thereon with flange means on said collar at either end of said casing to hold the casing in a stationary axial position.